(12) United States Patent
Johnson et al.

(10) Patent No.: US 10,042,670 B2
(45) Date of Patent: Aug. 7, 2018

(54) PROVIDING AUTOMATIC RETRY OF TRANSACTIONS WITH DIAGNOSTICS

(75) Inventors: Paul Johnson, Fair Oak (GB); Colin R. Penfold, Swanmore (GB)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 13/470,856

(22) Filed: May 14, 2012

(65) Prior Publication Data

US 2012/0226945 A1    Sep. 6, 2012

(30) Foreign Application Priority Data

May 18, 2010   (EP) ..................................... 10163129

(51) Int. Cl.
| | |
|---|---|
| *G06F 11/00* | (2006.01) |
| *G06F 9/46* | (2006.01) |
| *G06F 11/07* | (2006.01) |
| *G06F 11/14* | (2006.01) |

(52) U.S. Cl.
CPC .......... *G06F 9/466* (2013.01); *G06F 11/0778* (2013.01); *G06F 11/0793* (2013.01); *G06F 11/1474* (2013.01)

(58) Field of Classification Search
USPC .......................................................... 714/15
See application file for complete search history.

(56) References Cited

U.S. PATENT DOCUMENTS

| | | | |
|---|---|---|---|
| 6,976,193 B2 | 12/2005 | Dubal | |
| 7,593,974 B2 | 9/2009 | Suzuki et al. | |
| 2002/0194537 A1 | 12/2002 | Ali | |
| 2005/0027542 A1* | 2/2005 | Bordawekar ............. | G06F 8/10 717/124 |
| 2005/0149601 A1* | 7/2005 | Cox ..................... | G06F 11/0751 709/200 |
| 2006/0153063 A1* | 7/2006 | Islam et al. ................... | 370/216 |
| 2006/0190460 A1 | 8/2006 | Chandrasekaran et al. | |
| 2008/0256167 A1* | 10/2008 | Branson ................ | G06F 9/5027 709/201 |
| 2009/0019312 A1 | 1/2009 | Kulkarni et al. | |
| 2011/0072310 A1* | 3/2011 | Lee ....................... | G06F 11/366 714/38.1 |
| 2013/0007523 A1* | 1/2013 | Unger ................. | G06F 11/3672 714/32 |
| 2013/0042146 A1* | 2/2013 | Unger ................. | G06F 11/3672 714/32 |

FOREIGN PATENT DOCUMENTS

| | | |
|---|---|---|
| EP | 1408410 A1 | 4/2004 |
| WO | 9212479 A1 | 7/1992 |

* cited by examiner

*Primary Examiner* — Amine Riad
(74) *Attorney, Agent, or Firm* — Winstead, P.C.

(57) ABSTRACT

A method, system and computer program product for handling a unit of work in a transaction processing system, in which the system comprises one or more production regions operating minimal or no diagnostic functions and one or more diagnostic regions operating maximal or full diagnostic functions. A unit of work is received, which is routed to a production region. After receiving a notification that the work has failed, the work is routed to a diagnostic region.

15 Claims, 5 Drawing Sheets

PROVIDING AUTOMATIC RETRY OF TRANSACTIONS WITH DIAGNOSTICS

CROSS-REFERENCE TO RELATED APPLICATIONS

This application claims priority under 35 U.S.C. §119(a) from European Patent Application No. 10163129.9, filed on May 18, 2010, the contents of which are incorporated herein by reference.

TECHNICAL FIELD

The present invention relates generally to transaction processing, and more particularly, to providing the automatic retry of transactions with diagnostics.

BACKGROUND

In computing, transaction processing is a type of information handling in which operations are divided into individual, indivisible, units of work called transactions. Each transaction must succeed or fail as a complete unit and cannot remain in an intermediate state. Transaction processing is designed to maintain a computer system, such as a database, in a known, consistent state. This is maintained by the fact that any operations that are interdependent are carried out on the system, either all completing successfully or all being cancelled successfully. For example, a typical banking transaction that involves moving money from a customer's savings account to a customer's bank account is a single transaction to the bank, but it involves at least two separate operations in computing terms. These operations are the debiting of the savings account and the crediting of the bank account. It can be seen from this example that all of the operations in the transaction must either both succeed or both fail, so that there is never any inconsistency in the bank's database. Transaction processing is designed to provide this.

Transaction processing allows multiple individual operations to be linked together automatically as a single, indivisible transaction. The transaction processing system ensures that either all operations in a transaction are completed without error, or none of them are completed. If some of the operations are completed but errors occur when the others are attempted, the transaction processing system rolls back all of the operations of the transaction, including the successful ones, thereby erasing all traces of the transaction and restoring the system to its previous consistent, known state. If all operations of a transaction are completed successfully, the transaction is committed by the system, and all changes to the database are made permanent.

Transaction processing systems usually have diagnostic functions available, for the purpose of detecting the cause of errors within a system, which can often be performing many thousands of transactions per second. One type of diagnostic function is the use of "tracing," which is the monitoring of a transaction as it is carried out within the transaction processing system, with data about the transaction being stored in a defined manner at a known location as the transaction is being performed. This allows an administrator to track the behavior of any specific transaction that fails, and assist in the detection of the actual problem that caused the transaction to fail.

To optimize the performance of the overall transaction processing system, production transactions systems are usually configured with minimal active tracing. When a problem occurs, this makes problem diagnosis very difficult, and usually requires a user to retry the transaction that specifically failed. This is both time consuming and error prone. In many cases, problems cannot be reproduced by the user as the system configuration will have changed since the original transaction was tried and failed, so that the problem will not reoccur. This does not, however, mean the problem has been solved, as later changes may cause the problem to recur.

BRIEF SUMMARY

In one embodiment of the present invention, a method for handling a unit of work in a transaction processing system, the system comprising one or more production regions operating minimal or no diagnostic functions and one or more diagnostic regions operating maximal or full diagnostic functions, the method comprises receiving a unit of work. The method further comprises routing the work to a production region. Additionally, the method comprises receiving a notification that the work has failed. In addition, the method comprises routing, by a processor, the work to a diagnostic region.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Owing to the principles of the present invention as discussed herein, it is possible to provide a transaction processing system in which there are little or no diagnostics slowing down production regions that are processing work, but that diagnostics can be used on a transaction when it fails so that diagnostic data is immediately available should the retry of the work fail. Some advantages of the present invention include improved diagnostics for failures, less likelihood of trace wrapping as would occur on a busy system, the automatic collection of additional diagnostics without user or operator intervention and the likelihood of faster and cheaper diagnosis of problems. Trace wrapping is the loss of diagnostics due to insufficient storage capacity being defined to contain them.

The transaction processing system is configured with a TOR (terminal/input request owning region) and multiple cloned AORs (application owning regions). User requests are routed from the TOR to an AOR to run. If an error occurs on the AOR, rather than letting the TOR return the error back to the user, the TOR can automatically reroute the transaction to another AOR with additional or full diagnostics enabled and retry the request. If the request works, that is acceptable, the user need never know. If the work failed, then there is a much greater likelihood that there are sufficient diagnostics to diagnose the problem.

In one embodiment, the method further comprises, after receiving a notification that the work has failed, checking that the diagnostic region is available, prior to routing the work to the diagnostic region. The availability of the diagnostic region can be checked prior to any new retry being sent to that region. This will ensure that too many rerouted requests are not sent to the diagnostic regions. If more than one diagnostic region is being used, then work can be balanced between the multiple regions, to ensure that no one region is overloaded with the retries. In general, the diagnostic region or region will be assigned a much lower level of system resources and will therefore operate a slower speed than production regions.

Advantageously, the method further comprises, after receiving a notification that the work has failed, checking that the work can and should be retried, prior to routing the work to the diagnostic region. Certain types of transactions may not be suitable for retrying, based on aspects of the operations within the transaction. For example, the transaction name can be used to identify whether or not the transaction is recoverable or non-recoverable, and this information can be used to decide whether or not to reroute the failed work to the diagnostic region.

In one embodiment, the method further comprises, after routing the work to the diagnostic region, receiving a further notification that the work has failed again and capturing diagnostic data. Should the work fail after it has been retried at the diagnostic region, then the system can be configured so that it automatically captures specific diagnostic data, which will be stored with any other information about the unit of work that is available (such as that gathered by any tracing present on the unit of work). This provides as much information as possible to an administrator who has to investigate the causes and effects of the system failure that caused the unit of work to fail.

In one embodiment, the method further comprises, after routing the work to the diagnostic region, receiving a further notification that the work has succeeded and notifying the source of the work accordingly. If the unit of work actually succeeds after being retried in the diagnostic region, then the transaction processing system can be configured so that it will ignore the original error and proceed on the basis that the work has been completed and committed. The source of the work can be notified that the work has succeeded and the system can continue to operate as normal. This reduces that amount of error management that is created and provides a more robust transaction processing system that will produce fewer errors in the way of units of work failing.

Figure 1:
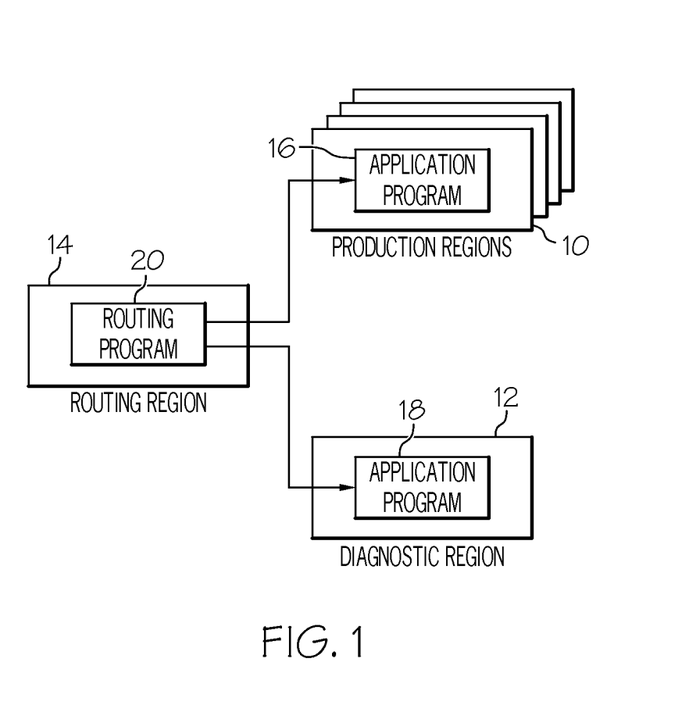
FIG. 1 is a schematic diagram of a transaction processing system in accordance with an embodiment of the present invention.

Referring now to the Figures in detail, FIG. 1 shows an example of a transaction processing system from a logical perspective in accordance with an embodiment of the present invention. The system comprises one or more production regions 10, in this example four production regions 10, and one or more diagnostic regions 12, in this example one diagnostic region 12. A routing region 14 is provided, which controls the flow of work to the production regions 10 and the diagnostic region 12. A single routing region 14 is shown, but it is possible to have more than one routing region 14. A routing program 20 routes work to application programs 16 and 18 located in the production regions 10 and the diagnostic region 12, respectively. User requests (also referred to as transactions or units of work) arrive at the routing region 14 for routing to the relevant region 10 or 12.

In the transaction processing system of FIG. 1, the production regions 10 operate with minimal or no diagnostic functions and the diagnostic region 12 operates with maximal or full diagnostic functions. Diagnostic functions, such as tracing, are enabled for specific regions, either manually by an operator or automatically using configuration data. These functions provide for the capture and recording of information about units of work, as the work is carried out within the respective region. While the main advantage of these functions is that they provide a large amount of information in the event of an error, the main disadvantage is that they slow down the processing within the regions.

The diagram of FIG. 1 is a logical representation of the different regions 10 and 12. In reality, shared hardware will provide the processing and storage requirements of the different regions 10 and 12. A specific amount of CPU resources will be assigned to the different regions 10 and 12, and in general the production regions 10 will be assigned the majority of the CPU resources, with the diagnostic region 12 assigned only a small amount of CPU resource. In general, the productions regions 10 will be operating to process thousands of user requests per second, with the diagnostic region 12 only being used in the defined circumstances when diagnostic information is required.

Figure 2:
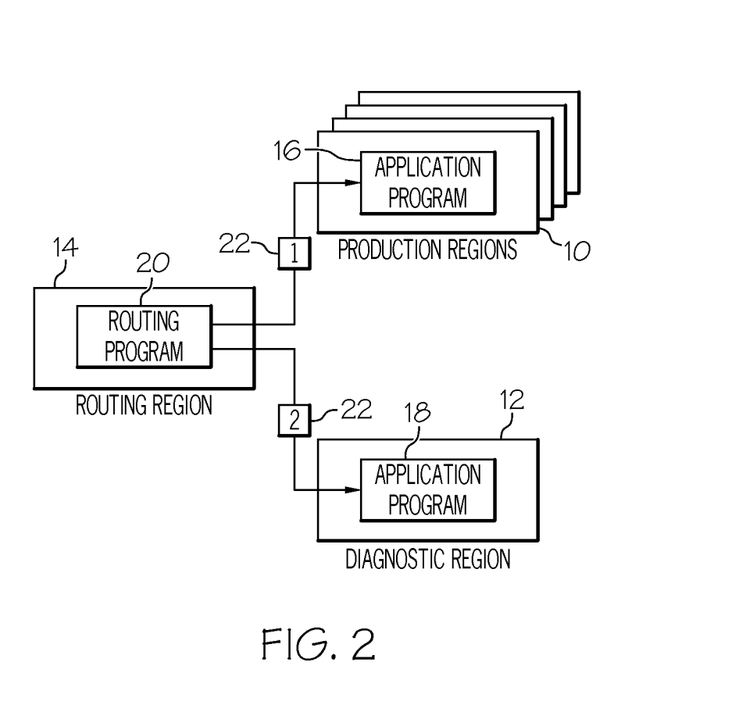
FIG. 2 illustrates routing of a unit of work in a transaction processing system in accordance with an embodiment of the present invention.

The system is configured with one or more terminal owned regions 14 (TORs) and a number of cloned application owned regions 10 and 12 (AORs). Most of the AORs are configured for production use. One or more are configured for diagnostics use. As shown in FIG. 2, which illustrates routing of a unit of work in accordance with an embodiment of the present invention, an incoming request 22 enters the TOR 14, which routes the request 22 to a production AOR 10. This can either be done dynamically or statically. The unit of work 22 is routed to the application program 16 within the production region 10. The request 22 runs in the AOR 10, which coordinates work that may run in other regions or systems. This work may be recoverable.

If the request 22 fails and the request 22 is recoverable, then the request 22 is backed out. The TOR 14 is notified of the failure. The TOR retries the request 22 by rerouting to a diagnostics AOR 12, which can either be done dynamically or statically. The request 22 runs successfully or fails in the diagnostics region 12 and notifies the TOR 14 which notifies the original source of the work 22. In this way, transactions 22 are first routed to a production region 10 and should the transaction 22 fail for any reason, then it is rerouted to the diagnostics region 12. The work 22 is then retried at the diagnostic region 12.

The retrying can be configured based on, for example, transaction name, which would also identify if it is a recoverable or non recoverable transaction. The retrying could also be based on a bend code or other diagnostics and/or the availability of the diagnostic system 10, as it would not be desirable to reroute too many request to one region. The retrying of the unit of work 22 in the diagnostic region 12 will result in either the work 22 succeeding or the work 22 failing for a second time. If the work 22 succeeds, then this is communicated back to the routing region 14 and the work 22 completes in the normal manner. If the work 22 has failed for a second time, then diagnostic information is now available. Retrying could also be based on other characteristics of the request or transaction 22. It may also be desirable for it to be based on other information, such as whether enough diagnostics has already been captured for a particular type of problem.

Figure 3:
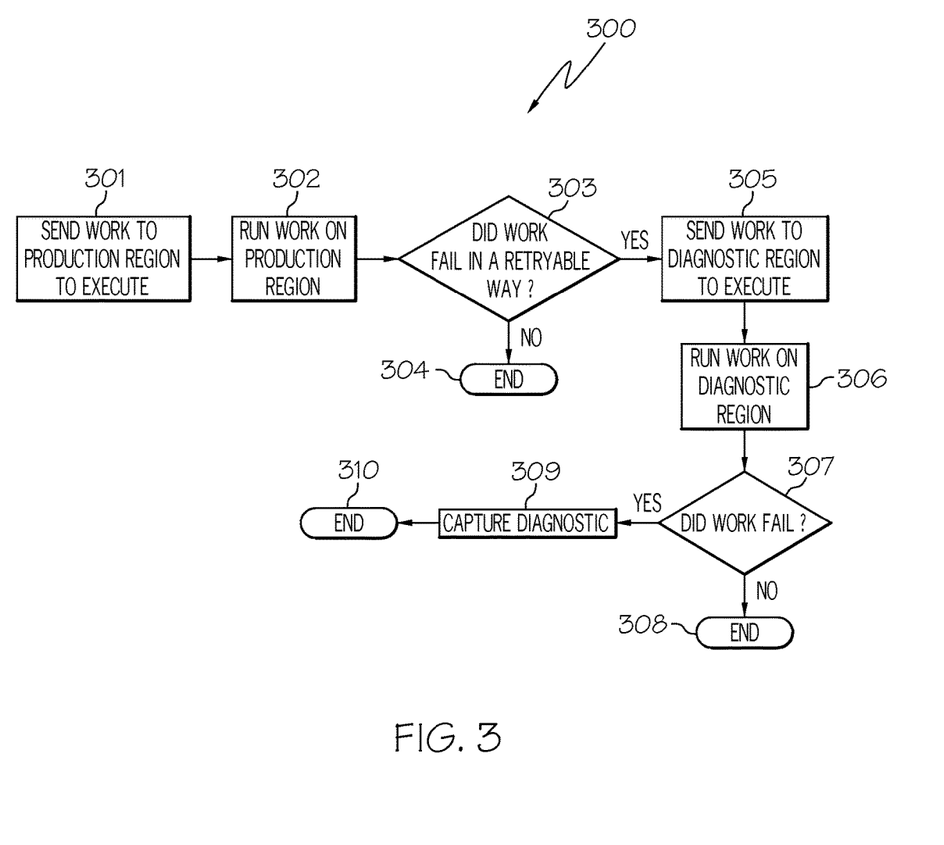
FIG. 3 is a flowchart of a method for operating the transaction processing system in accordance with an embodiment of the present invention.

A flowchart summarizing the handling of the unit of work 22 is shown in FIG. 3. FIG. 3 is a flowchart of a method 300 for operating the transaction processing system in accordance with an embodiment of the present invention.

Referring to FIG. 3, in conjunction with FIGS. 1-2, in step 301, the routing program 20 sends the work 22 to a production region 10 for the work 22 to be executed. In step 302, the work 22 runs on the production region 10. The routing program 20 is informed if the work 22 was successful or failed.

If the work 22 failed, then in step 303, a determination is made as to whether the work failed in a manner that can be retried and that it is desirable to take diagnostics. The retrying can be configured based on, for example, transaction name or other information, such as whether enough diagnostics has already been captured for a particular type of problem. If the answer is no, then the method 300 terminates at step 304. At this point, a conventional error is generated.

If, however, the work failed in a manner that can be retried and it is desirable to take diagnostics, then, in step 305, the routing program 20 sends the work 22 to the diagnostic region 12 to execute. In step 306, the work 22 is executed on the diagnostic region 12. In step 307, a determination is made as to whether the work 22 failed or not. If the work did not fail, then method 300 terminates at step 308. At this point, the original piece of work 22 has been successfully executed. The fact that this occurred in the diagnostic region 12 is not consequential, it is sufficient that the work has been carried out somewhere in the system.

Should, however, the work fail for a second time while retried on the diagnostic region 12, then, in step 309, the diagnostics are captured followed by terminating the process in step 310. The capturing diagnostics step is in addition to any diagnostic data that is being captured automatically by virtue of the fact that the unit of work 22 was being executed in the diagnostic region. For example, a dump of the system in its current state may be taken in order to acquire as much data as possible about the current configuration for the purpose of assisting any later error analysis that might take place following the ultimate failure of the work 22 on the diagnostic region 12.

For any transaction 22 that the system would be able to retry, there is an alternative region 12 that has access to the same set of resources. The alternative region 22 is constantly sat as a "spare" doing no work except from re-running previously failed transactions 22. When a transaction 22 is re-run with tracing on within this region 12, there are very few other transactions running in parallel to interfere with behavior and hence the chance of success may be higher. If the original transaction failure was due to bad data or defective program logic, the re-run transaction would fail again, and in this case, the system would capture good diagnostic data.

In some implementations, method 300 may include other and/or additional steps that, for clarity, are not depicted. Further, in some implementations, method 300 may be executed in a different order presented and that the order presented in the discussion of FIG. 3 is illustrative. Additionally, in some implementations, certain steps in method 300 may be executed in a substantially simultaneous manner or may be omitted.

Figure 4:
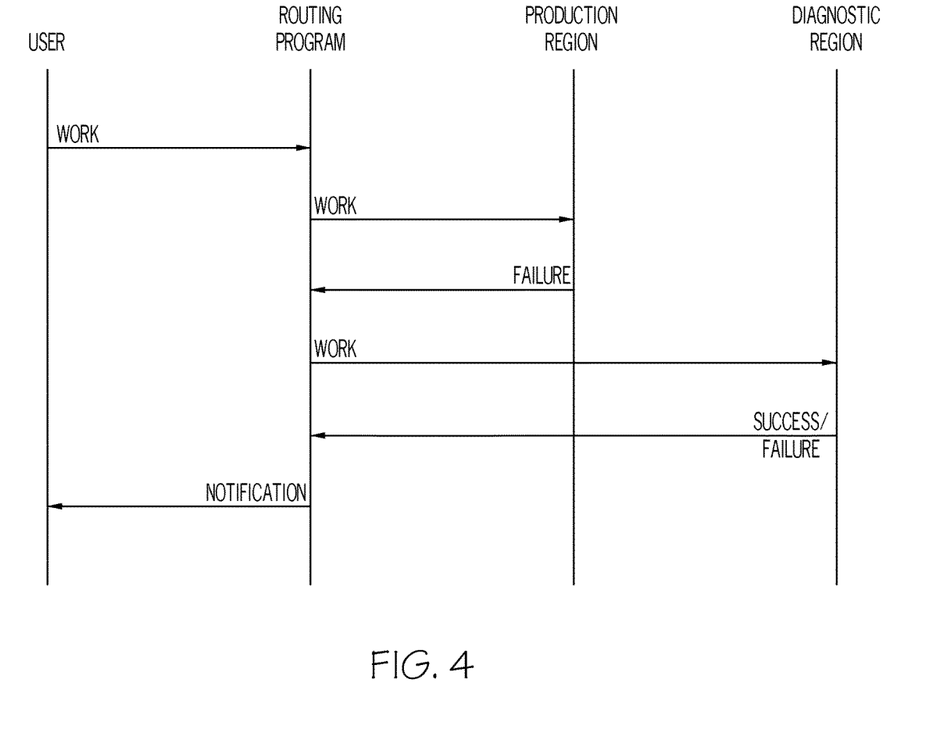
FIG. 4 illustrates the communication flow within the transaction processing system in accordance with an embodiment of the present invention.

FIG. 4 illustrates the communication flow within the transaction processing system in accordance with an embodiment of the present invention, using the routing of the unit of work 22 described above. Referring to FIG. 4, in conjunction with FIGS. 1-3, the user will first initiate the work 22, which goes to the routing program 20, which then sends that work 22 to a production region 10. On the failure of that work 22 at the production region 10, the routing program 20 will send the work 22 to the diagnostic region 12, for execution of the work 22 under the diagnostic conditions. The success or failure of that work 22 in the diagnostic region 12 is communicated back to the routing program 20, which then notifies the user accordingly.

In this way, a transaction processing system is provided in which there are few or no diagnostics slowing down the production regions 10 that are processing normal work 22, but that diagnostics can be used on a transaction 22 when it fails by retrying the work 22 in the diagnostic region 12, so that diagnostic data is immediately available should the retry of the work still fail. This configuration of the transaction processing system provides improved diagnostics for transaction failures, the automatic collection of additional diagnostics without user or operator intervention and the likelihood of faster and cheaper diagnosis of problems. If the work 22 is successful when retried, then this reduces the amount of errors produced, without the user being aware that any retry took place.

Figure 5:
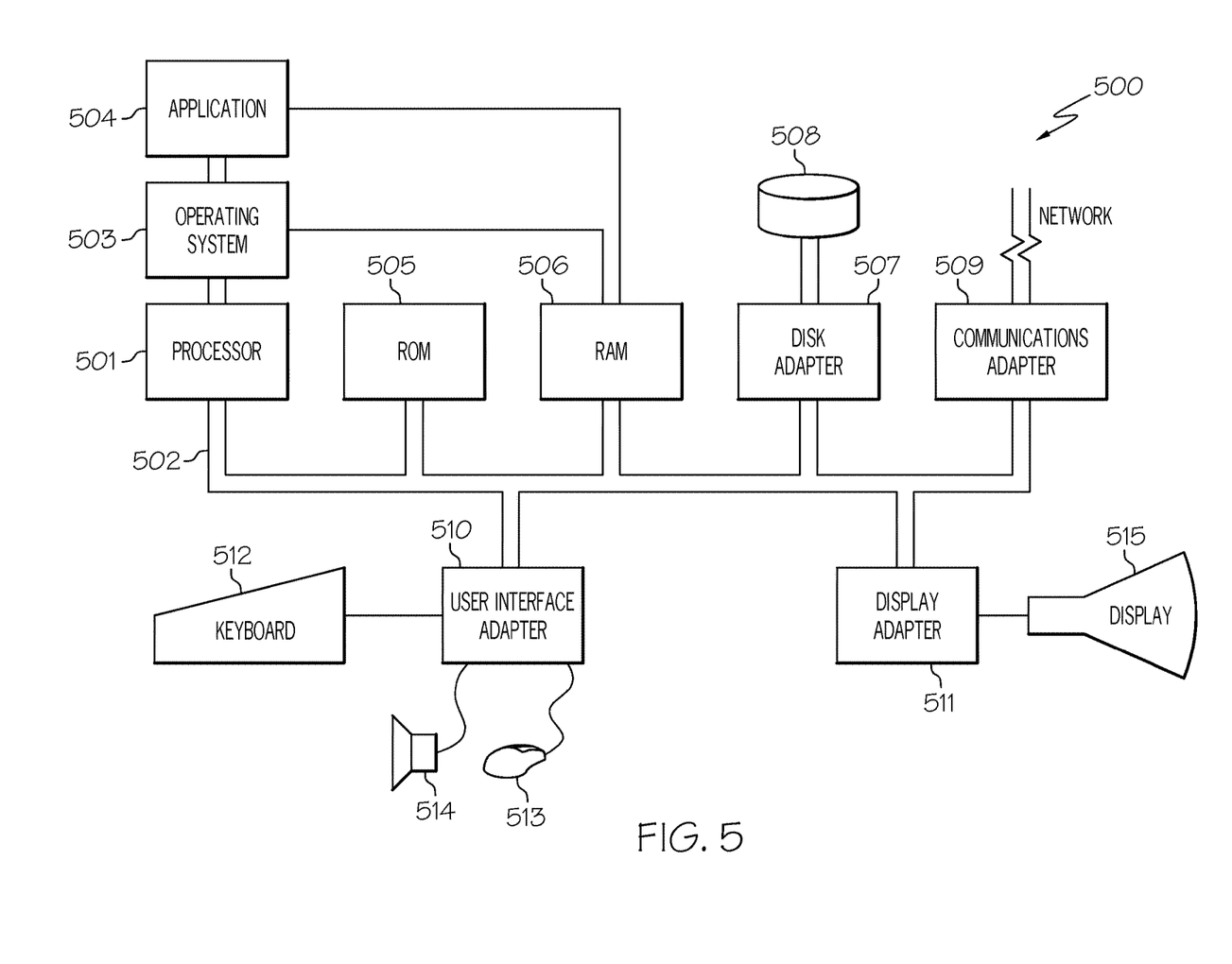
FIG. 5 depicts an embodiment of a hardware configuration of a computer system which is representative of a hardware environment for practicing the present invention.

FIG. 5 depicts an embodiment of a hardware configuration of a computer system 500 which is representative of a hardware environment for practicing the present invention. Referring to FIG. 5, computer system 500 has a processor 501 coupled to various other components by system bus 502. An operating system 503 may run on processor 501 and provide control and coordinate the functions of the various components of FIG. 5. An application 504 in accordance with the principles of the present invention may run in conjunction with operating system 503 and provide calls to operating system 503 where the calls implement the various functions or services to be performed by application 504. Application 504 may include, for example, an application for handling a unit of work in a transaction processing system as discussed above.

Referring again to FIG. 5, read-only memory ("ROM") 505 may be coupled to system bus 502 and include a basic input/output system ("BIOS") that controls certain basic functions of computer system 500. Random access memory ("RAM") 506 and disk adapter 507 may also be coupled to system bus 502. It should be noted that software components including operating system 503 and application 504 may be loaded into RAM 506, which may be computer system's 500 main memory for execution. Disk adapter 507 may be an integrated drive electronics ("IDE") adapter that communicates with a disk unit 508, e.g., disk drive.

Computer system 500 may further include a communications adapter 509 coupled to bus 502. Communications adapter 509 may interconnect bus 502 with an outside network thereby allowing computer system 500 to communicate with other similar devices.

I/O devices may also be connected to computer system 500 via a user interface adapter 510 and a display adapter 511. Keyboard 512, mouse 513 and speaker 514 may all be interconnected to bus 502 through user interface adapter 510. A display monitor 515 may be connected to system bus 502 by display adapter 511. In this manner, a user is capable of inputting to computer system 500 through keyboard 512 or mouse 513 and receiving output from computer system 500 via display 515 or speaker 514.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for handling a unit of work in a transaction processing system, the system comprising one or more production regions operating minimal or no diagnostic functions and one or more diagnostic regions operating maximal or full diagnostic functions, wherein the one or more production regions are assigned more computing resources than the one or more diagnostic regions, the method comprising:
   receiving a unit of work;
   routing the work to an application program within a production region to execute;
   executing the work on the production region;
   receiving a notification that the work has failed after executing the work on the production region;
   after receiving the notification that the work has failed, determining whether the work failed in a manner that allows it to be retried;

routing, by a processor, the work to a diagnostic region to execute in response to determining that the work failed in the manner that allows it to be retried;

executing the work on the diagnostic region; and capturing diagnostic information in response to the work failing a second time, wherein the captured diagnostic information comprises tracing information.

2. The method as recited in claim 1 further comprising:

after receiving the notification that the work has failed, checking that the diagnostic region is available, prior to routing the work to the diagnostic region.

3. The method as recited in claim 1, wherein the work is retried at the diagnostic region based on a transaction name or an abend code.

4. The method as recited in claim 1 further comprising:

after routing the work to the diagnostic region, receiving a further notification that the work has failed again.

5. The method as recited in claim 1 further comprising:

after routing the work to the diagnostic region, receiving a further notification that the work has succeeded and notifying a source of the work accordingly.

6. A computer program product for handling a unit of work in a transaction processing system, the computer program product comprising a non-transitory computer readable storage medium having program code embodied therewith, the system comprising one or more production regions operating minimal or no diagnostic functions and one or more diagnostic regions operating maximal or full diagnostic functions, wherein the one or more production regions are assigned more computing resources than the one or more diagnostic regions, the program code comprising the programming instructions for:

receiving a unit of work;

routing the work to an application program within a production region to execute;

executing the work on the production region;

receiving a notification that the work has failed after executing the work on the production region;

after receiving the notification that the work has failed, determining whether the work failed in a manner that allows it to be retried;

routing the work to a diagnostic region to execute in response to determining that the work failed in the manner that allows it to be retried;

executing the work on the diagnostic region; and capturing diagnostic information in response to the work failing a second time, wherein the captured diagnostic information comprises tracing information.

7. The computer program product as recited in claim 6, wherein the program code further comprises the programming instructions for:

after receiving the notification that the work has failed, checking that the diagnostic region is available, prior to routing the work to the diagnostic region.

8. The computer program product as recited in claim 6, wherein the work is retried at the diagnostic region based on a transaction name or an abend code.

9. The computer program product as recited in claim 6, wherein the program code further comprises the programming instructions for:

after routing the work to the diagnostic region, receiving a further notification that the work has failed again.

10. The computer program product as recited in claim 6, wherein the program code further comprises the programming instructions for:

after routing the work to the diagnostic region, receiving a further notification that the work has succeeded and notifying a source of the work accordingly.

11. A transaction processing system, comprising:

a memory unit for storing a computer program for handling a unit of work in the transaction processing system, the system comprising one or more production regions operating minimal or no diagnostic functions and one or more diagnostic regions operating maximal or full diagnostic functions, wherein the one or more production regions are assigned more computing resources than the one or more diagnostic regions; and a processor coupled to the memory unit, wherein the processor, responsive to the computer program, comprises:

circuitry for receiving a unit of work;

circuitry for routing the work to an application program within a production region to execute;

circuitry for executing the work on the production region;

circuitry for receiving a notification that the work has failed after executing the work on the production region;

circuitry for after receiving the notification that the work has failed, determining whether the work failed in a manner that allows it to be retried;

circuitry for routing the work to a diagnostic region to execute in response to determining that the work failed in the manner that allows it to be retried;

circuitry for executing the work on the diagnostic region; and circuitry for capturing diagnostic information in response to the work failing a second time, wherein the captured diagnostic information comprises tracing information.

12. The system as recited in claim 11, wherein said processor further comprises:

after receiving the notification that the work has failed, circuitry for checking that the diagnostic region is available, prior to routing the work to the diagnostic region.

13. The system as recited in claim 11, wherein the work is retried at the diagnostic region based on a transaction name or an abend code.

14. The system as recited in claim 11, wherein said processor further comprises:

after routing the work to the diagnostic region, circuitry for receiving a further notification that the work has failed again.

15. The system as recited in claim 11, wherein said processor further comprises:

after routing the work to the diagnostic region, circuitry for receiving a further notification that the work has succeeded and notifying a source of the work accordingly.

* * * * *